United States Patent
McCloskey et al.

(10) Patent No.: US 7,769,915 B1
(45) Date of Patent: Aug. 3, 2010

(54) SYSTEMS AND METHOD OF CONTROLLING CONTROL AND/OR MONITORING DEVICES

(75) Inventors: John McCloskey, Kensington, MD (US); D. Mitchell Carr, Potomac Falls, VA (US); Hieu Nguyen, Colleyville, TX (US)

(73) Assignee: Nextel Communications Inc., Reston, VA (US)

( * ) Notice: Subject to any disclaimer, the term of this patent is extended or adjusted under 35 U.S.C. 154(b) by 171 days.

(21) Appl. No.: 11/969,995

(22) Filed: Jan. 7, 2008

(51) Int. Cl.
G06F 3/00 (2006.01)
G06F 9/00 (2006.01)
G06F 9/24 (2006.01)
G06F 15/177 (2006.01)
H04M 1/24 (2006.01)
H04M 3/08 (2006.01)
G01R 31/28 (2006.01)

(52) U.S. Cl. .................. 710/11; 379/32.01; 379/33; 713/1; 713/2; 714/712

(58) Field of Classification Search .................. 710/11; 379/32.01, 33; 713/1, 2; 714/712
See application file for complete search history.

(56) References Cited

U.S. PATENT DOCUMENTS

| 6,785,255 | B2 * | 8/2004 | Sastri et al. ................. 370/338 |
| 7,016,668 | B2 * | 3/2006 | Vaidyanathan et al. ...... 455/418 |
| 7,209,945 | B2 | 4/2007 | Hicks, III et al. |
| 7,346,369 | B2 * | 3/2008 | Fitton et al. .............. 455/553.1 |
| 7,486,930 | B2 * | 2/2009 | Bisdikian et al. .......... 455/432.3 |
| 2002/0082044 | A1 * | 6/2002 | Davenport .................. 455/552 |
| 2004/0116140 | A1 * | 6/2004 | Babbar et al. ............... 455/517 |
| 2006/0209857 | A1 | 9/2006 | Hicks, III |
| 2006/0253415 | A1 * | 11/2006 | Chakraborty et al. .......... 707/1 |
| 2006/0287001 | A1 * | 12/2006 | Budampati et al. ....... 455/552.1 |
| 2007/0162634 | A1 * | 7/2007 | Okazaki ...................... 710/15 |

FOREIGN PATENT DOCUMENTS

GB 2350749 A * 12/2000

* cited by examiner

Primary Examiner—Niketa I Patel
Assistant Examiner—Farley J Abad

(57) ABSTRACT

Systems and methods of controlling control and/or monitoring devices are provided. A controller can include a software defined radio in order to communicate with control and/or monitoring devices that employ different communication protocols. The controller can be in the form of a memory stick, memory card or dongle.

13 Claims, 4 Drawing Sheets

SYSTEMS AND METHOD OF CONTROLLING CONTROL AND/OR MONITORING DEVICES

BACKGROUND OF THE INVENTION

For many years utility companies have used telemetry to remotely obtain readings from utility meters. The development of the X10® protocol led to an increased adoption of remote monitoring and/or control of devices. The X10® protocol uses existing power lines to communicate with remote devices.

In addition to the X10® protocols, there are a number of other protocols that have been developed that provide for remote monitoring and/or control of devices, including 802.15.4, Zigbee®, Z-Wave®, and Insteon®. Each of these protocols is incompatible with the other protocols, and accordingly requires a separate controller. The different protocols involve different frequency bands, modulation and/or control signals. The proliferation of different incompatible protocols will likely greatly hinder the adoption of these protocols.

Exemplary embodiments of the present invention are directed to systems and method of controlling control and/or monitoring devices. An exemplary controller includes a communication interface coupled to one or more control and/or monitoring devices via a communication medium and a software defined radio coupled to the communication interface. The controller also includes a processor coupled to the software defined radio. The processor includes logic to identify a communication protocol of the one or more control and/or monitoring devices and logic to instruct the software defined radio to employ the determined communication protocol for communications with the one or more control and/or monitoring devices.

An exemplary method of processing data by a controller includes monitoring a communication interface, and determining whether a new device is detected on the communication interface. The method also includes determining a protocol of the new device, and instructing a software defined radio to communicate with the new device using the determined protocol.

Other objects, advantages and novel features of the present invention will become apparent from the following detailed description of the invention when considered in conjunction with the accompanying drawings.

BRIEF DESCRIPTION OF THE DRAWING FIGURES

DETAILED DESCRIPTION OF THE PREFERRED EMBODIMENTS

Figure 1A:
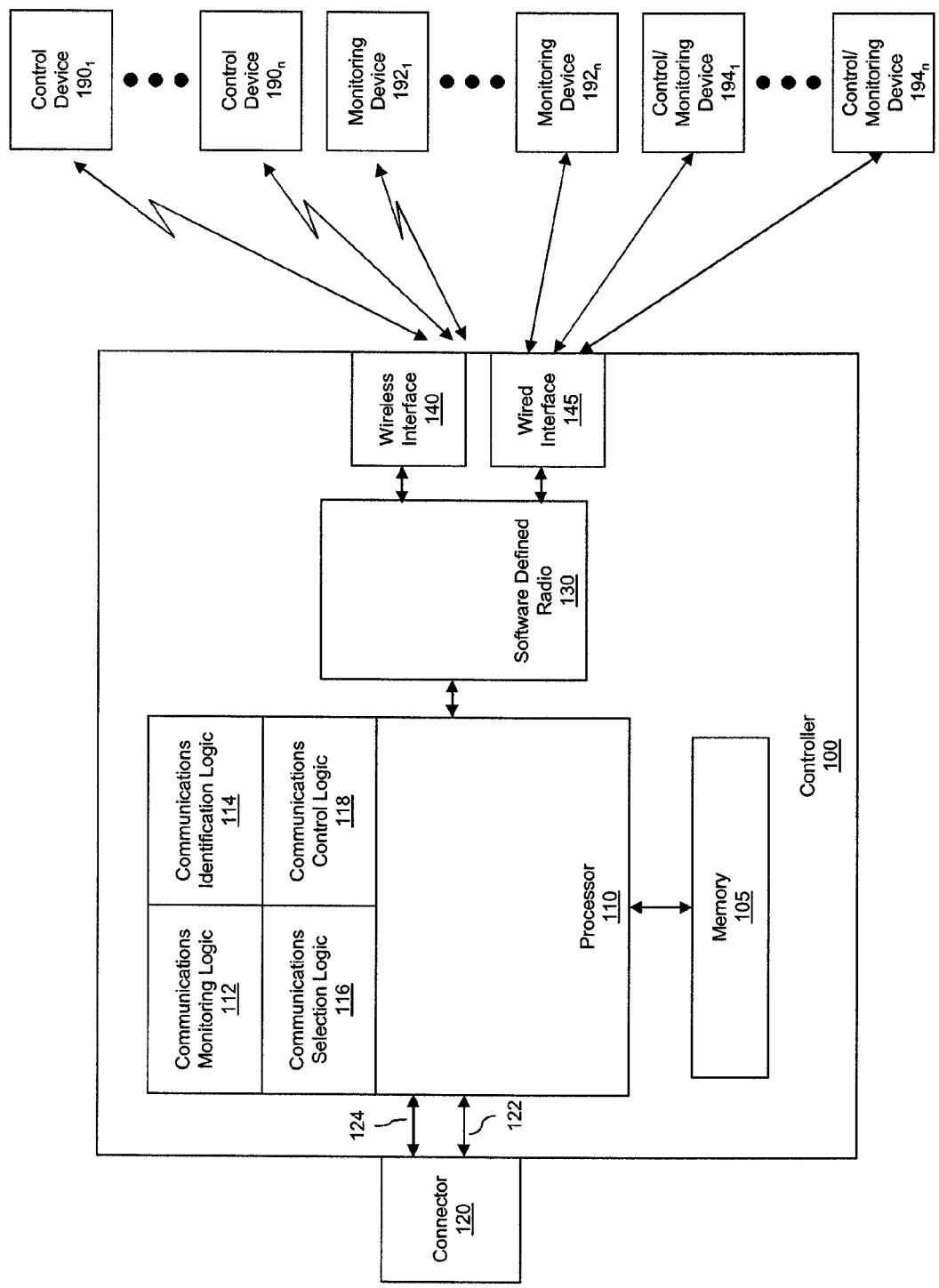
FIG. 1A is a block diagram of an exemplary system in accordance with the present invention.

FIG. 1A is a block diagram of an exemplary system in accordance with the present invention. The system includes controller 100 coupled to one or more control and/or monitoring devices $190_1$-$190_n$, $192_1$-$192_n$ or $194_1$-$194_n$. The control and/or monitoring devices can be any type of such devices, including, but not limited to, lighting control and/or monitoring devices, temperature control and/or monitoring devices, camera control and/or monitoring devices, automation control and/or monitoring devices, and/or the like. Controller 100 can be coupled to control and/or monitoring devices $190_1$-$190_n$, $192_1$-$192_n$ or $194_1$-$194_n$ by a wireless air interface using interface 140 or by a wired communication interface using interface 145. Although FIG. 1A illustrates control devices $190_1$-$190_n$ and monitoring device $192_1$ coupled to controller by a wireless air interface while other monitoring devices and the control/monitoring devices $194_1$-$194_n$ are coupled by a wired communication interface, any of the devices $190_1$-$190_n$, $192_1$-$192_n$, and $194_1$-$194_n$ can be coupled by either a wired or wireless interface.

Controller 100 includes a software defined radio 130 coupled to wireless interface 140, wired interface 145 and processor 110. Software defined radio 130 is arranged to receive instructions from processor 110 and configure itself to communicate with one or more control and/or monitoring devices 1901-190n, 1921-192n or 1941-194n using one of a plurality of different communication protocols, such as X10® 802.15.4, Zigbee®, Z-Wave®, and Insteon® and/or the like. These communication protocols can include a particular frequency band, modulation technique, error correction coding, multiplexing technique, multiple access communication technique and/or the like. The frequency bands can include, for example, open frequency bands such as the 900 MHz and 2.4 GHz frequency bands. The modulation techniques can include, for example, frequency hopping or direct sequence spread spectrum.

Processor 110 is coupled to memory 105 and connector 120. Specifically, processor 110 is coupled to connector 120 by a communication link 122 and a power link 124. Connector 120 can be any type of connector that is capable of providing both data communication and power to controller 100, and can be a universal serial bus (USB) connector, IEEE 1394 or the like. As will be described in more detail below, connector 120 can be coupled to a computer or other device that can issue commands for control and/or monitoring devices $190_1$-$190_n$, $192_1$-$192_n$ or $194_1$-$194_n$. The computer or other device can also be coupled to a broadband network, and transmit and receive data and/or commands by way of the network.

Processor 110 includes logic 112-118, which will be described in more detail below in connection with FIG. 2. Processor 110 can be any type of processor, such as a microprocessor, field programmable gate array (FPGA) and/or an application specific integrated circuit (ASIC). When processor 110 is a microprocessor then logic 112-118 can be processor-executable code loaded from memory 105.

Figure 1B:
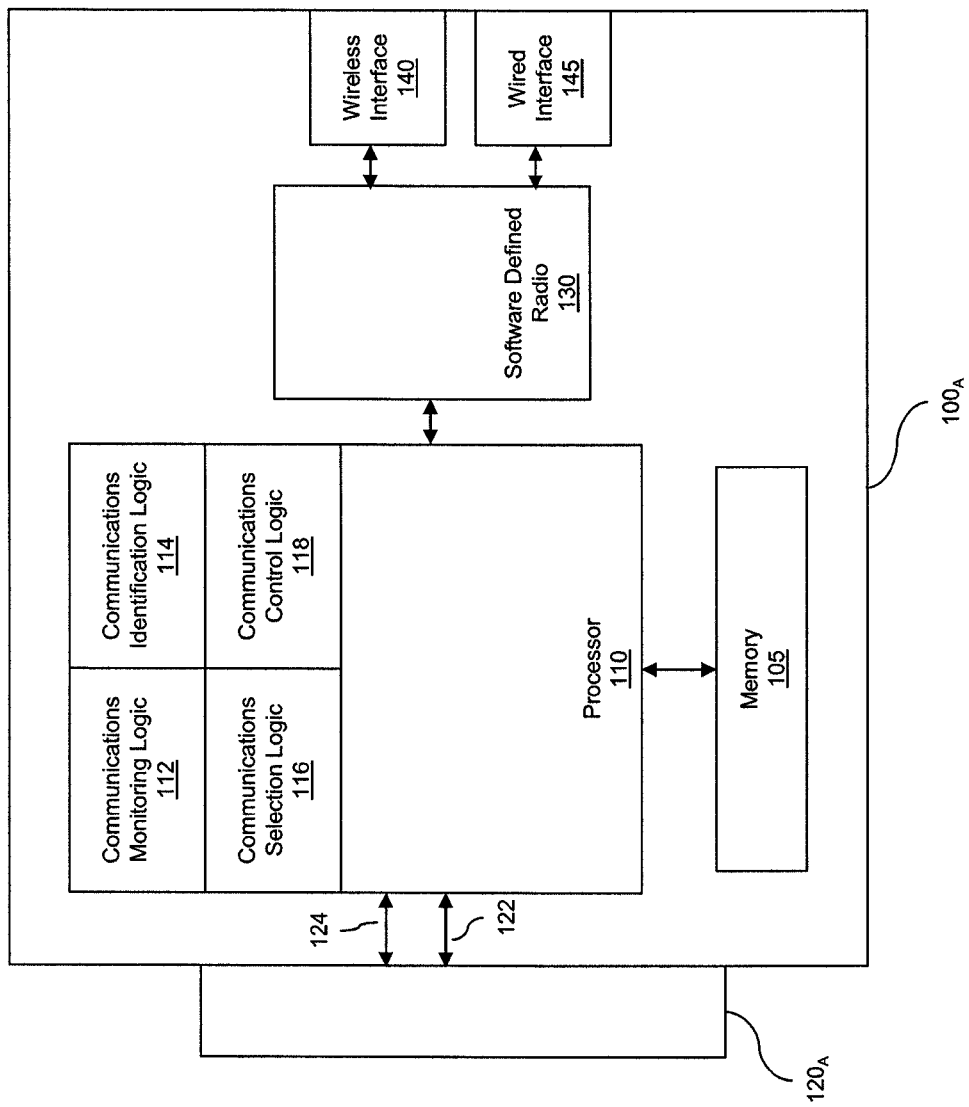
FIGS. 1B and 1C are block diagrams of exemplary controllers in accordance with the present invention.
Figure 1C:
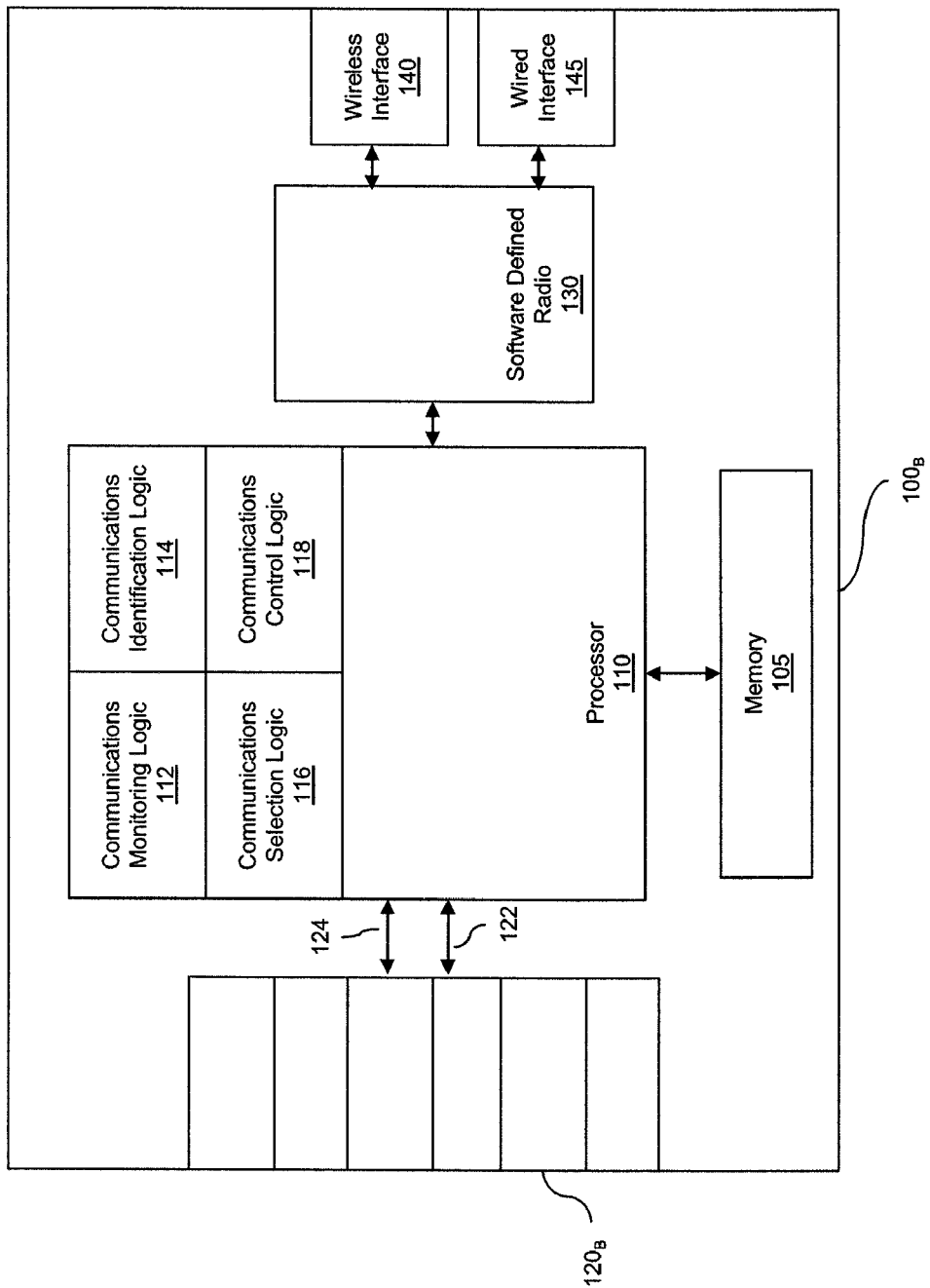

FIGS. 1B and 1C are block diagrams of exemplary controllers in accordance with the present invention. The controllers 100 each include a connector 120, and in FIG. 1B connector $120_A$ extends past the body of the controller, while in FIG. 1C connector $120_B$ is integrated into the body of the controller. The controller of FIG. 1B is arranged in the form of a so-called USB memory stick or dongle, and the controller of FIG. 1C is arranged in the form of a flash memory card. Using either of the connections $120_A$ or $120_B$ allows the controller to be coupled directly to a computer without requiring an additional cable.

Figure 2:
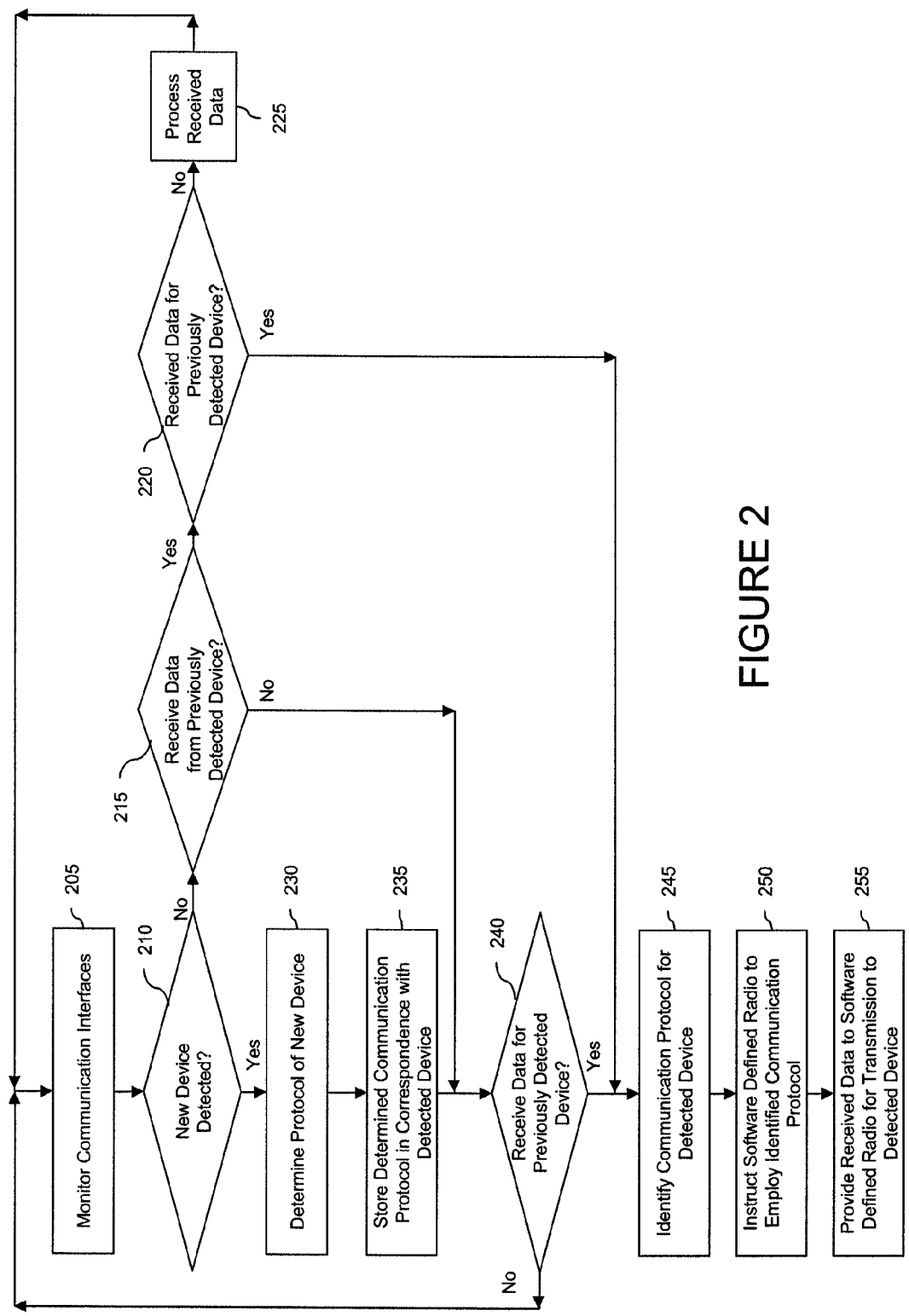
FIG. 2 is a flow diagram of an exemplary method in accordance with the present invention.

FIG. 2 is a flow diagram of an exemplary method in accordance with the present invention. Initially, logic 112 monitors wireless and wired interfaces 140 and 145, and determines whether a new control and/or monitoring device is detected (steps 205 and 210). When a new device is not detected ("No" path out of decision step 210), then logic 112 determines whether data is received from a previously detected device (step 215). When data is received from a previously detected device ("Yes" path out of decision step 215), then processor 110 determines whether the received data is for a previously detected device (step 220).

When the received data is not for a previously detected device ("No" path out of decision step 220), then processor 110 processes the received data (step 225), and logic 112 continues to monitor the communication interfaces (step 205). In this case the data will be for either a device that has not yet been detected or for controller 100. In the former case, the processing can involve either discarding the data or storing the data for transmission to the device once it has been detected. In the latter case, the processing can include, for example, transmitting the data to another device, such as a computer (for processing by the computer and/or for transmission to another device coupled to the computer by a network), using connector 120.

Returning to step 210, when a new device is detected ("Yes" path out of decision step 210), then logic 114 determines the protocol of the new device (step 230) and stores the determined protocol in correspondence with an identification of the detected device in memory 105 (step 235). After storing the determined protocol (step 230) or when data has not been received from a previously detected device ("No" path out of decision step 215), then logic 112 determines whether data has been received (step 240). This data can be received either from one of the control and/or monitoring devices $190_1$-$190_n$, $192_1$-$192_n$, or $194_1$-$194_n$, or from a device coupled to connector 120. In this case the newly detected device is considered as a previously detected device because the protocol of the newly detected device has been determined and stored.

When data has not been received for a previously detected device ("No" path out of decision step 240), then logic 112 continues to monitor the communication interfaces (step 205). When data is received for a previously detected device ("Yes" path out of decision step 235 or 220), then logic 116 accesses memory 105 in order to select the appropriate protocol for the device (step 245), and logic 118 converts the data (if necessary) and instructs software defined radio 130 to employ the identified communication protocol (step 250). The received data is then provided to software defined radio 130 for transmission to the device using the selected communication protocol (step 255).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A controller, comprising: a communication interface coupled to one or more control and/or monitoring devices via a communication medium, said communication interface comprising a wireless communication interface and a wired communication interface;
   a software defined radio coupled to the communication interface;
   a processor coupled to the software defined radio, the processor including
      logic to identify a communication protocol of the one or more control and/or monitoring devices, wherein the communication protocol of each of the one or more control and/or monitoring devices comprises one of a plurality of wireless communication protocols;
      logic to instruct the software defined radio to employ the identified communication protocol for communications with the one or more control and/or monitoring devices; and
      logic to monitor the communication interface and to determine whether a new control and/or monitoring device is detected through the communication interface,
         wherein when a new control and/or monitoring device is not detected and when the logic determines that data is received from a previously detected control and/or monitoring device, and when said data is not for a previously detected control and/or monitoring device, the logic processes the data and continues monitoring the communication interface, and
         when a new control and/or monitoring device is detected and when the received data is for a previously detected control and/or monitoring device, the logic provides the received data to the software defined radio for transmission to the previously detected control and/or monitoring device using the identified communication protocol.

2. The controller of claim 1, further comprising:
   a connector coupled to the processor, wherein the connector receives data and power from another device.

3. The controller of claim 2, wherein the connector is arranged to connect to a universal serial bus (USB) or IEEE 1394 port.

4. The controller of claim 2, wherein the data received from the another device is sent by way of a broadband network.

5. The controller of claim 2, wherein the processor further includes logic to select a communication protocol, wherein when the processor receives data from the another device, the logic to select a communication protocol selects a communication protocol from a number of communication protocols, based on a destination for the received data.

6. The controller of claim 2, wherein the controller is included in a packaging that incorporates the connector, and the connector attached directly to the another device independent of a cable.

7. The controller of claim 1, wherein, depending on the selected communication protocol, the software defined radio can communicate over one of several different sets of frequency bands.

8. The controller of claim 1, wherein, depending on the selected communication protocol, the software defined radio can communicate using one of frequency hopping and direct sequence spread spectrum modulation techniques.

9. A method of processing data by a controller, the method comprising the acts of:
   monitoring a wireless communication interface and a wired communication interface;
   determining whether a new device is detected on the wireless communication interface or the wired communication interface;
   determining a communication protocol of the new device, wherein the communication protocol of the new device comprises one of a plurality of wireless communication protocols; and
   instructing a software defined radio to communicate with the new device using the determined communication protocol,
   wherein when a new device is not detected and data is received from a previously detected device, processing the data and further monitoring the communication interfaces, and when a new device is detected and when data is received for a previously detected device, providing the received data to the software defined radio for transmission to the previously detected device according to a determined communication protocol of the previously detected device.

10. The method of claim 9, further comprising the acts of:
receiving data for another device;
identifying a protocol of the another device; and
instructing the software defined radio to communicate with the another device using the identified protocol.

11. The method of claim 9, further comprising the acts of:
periodically monitoring the wireless communication interface and the wired communication interface;
determining that the new device is transmitting data;
receiving the transmitted data; and
processing the received data based on the determined protocol of the new device.

12. The method of claim 9, wherein, depending on the selected communication protocol, the software defined radio can communicate over one of several different sets of frequency bands.

13. The method of claim 9, wherein, depending on the selected communication protocol, the software defined radio can communicate using one of frequency hopping and direct sequence spread spectrum modulation techniques.

* * * * *